US010259399B2

(12) United States Patent
Yang

(10) Patent No.: US 10,259,399 B2
(45) Date of Patent: Apr. 16, 2019

(54) MOUNTING DEVICE AND METHOD FOR REMOTELY MOUNTING CELL PHONE TO VEHICLE VENT REGISTER

(71) Applicant: Ue-Ming Yang, Chicago, IL (US)

(72) Inventor: Ue-Ming Yang, Chicago, IL (US)

( * ) Notice: Subject to any disclaimer, the term of this patent is extended or adjusted under 35 U.S.C. 154(b) by 49 days.

(21) Appl. No.: 15/694,796

(22) Filed: Sep. 2, 2017

(65) Prior Publication Data

US 2019/0071027 A1   Mar. 7, 2019

(51) Int. Cl.
| | |
|---|---|
| *B60R 11/02* | (2006.01) |
| *B60R 11/00* | (2006.01) |
| *F16M 13/00* | (2006.01) |
| *F16M 11/40* | (2006.01) |
| *H04M 1/04* | (2006.01) |
| *F16M 13/02* | (2006.01) |

(52) U.S. Cl.
CPC ......... *B60R 11/0241* (2013.01); *F16M 11/40* (2013.01); *H04M 1/04* (2013.01); *B60R 2011/007* (2013.01); *B60R 2011/0008* (2013.01); *B60R 2011/0059* (2013.01); *B60R 2011/0089* (2013.01); *F16M 13/02* (2013.01)

(58) Field of Classification Search
CPC ......... B60R 11/0241; B60R 2011/0008; B60R 2011/007; B60R 2011/0089; F16M 11/40; F16M 13/02; H04M 1/04

USPC ............ 248/125.7, 126, 122.1, 177.1, 187.1, 248/188.4, 314, 316.7, 188; 224/483, 224/545, 556, 560, 561, 926, 929; 379/454, 455

See application file for complete search history.

(56) References Cited

U.S. PATENT DOCUMENTS

| | | | | |
|---|---|---|---|---|
| 2,751,175 | A * | 6/1956 | Jones ....................... | F16L 3/24 248/72 |
| 5,979,724 | A * | 11/1999 | Loewenthal, Jr. ............... | B60R 11/0241 224/483 |
| 6,205,719 | B1 * | 3/2001 | Bruce ....................... | G09F 7/18 52/147 |
| 9,080,714 | B2 * | 7/2015 | Minn ................... | B60R 11/0241 |
| 9,701,256 | B2 * | 7/2017 | Haymond ............... | B60R 11/02 |
| 10,173,607 | B1 * | 1/2019 | Omelchenko ....... | B60R 11/0241 |
| 2013/0233986 | A1 * | 9/2013 | Rasheta ............... | G03B 17/561 248/205.1 |
| 2015/0028075 | A1 * | 1/2015 | Khatchatrian .......... | B60R 11/02 224/483 |

* cited by examiner

Primary Examiner — Tan Le

(57) ABSTRACT

A tripod is used for remotely mounting cell phone to vehicle vent register without blocking air flow. One leg has a U hook rotatable for engaging to either a horizontal or vertical louver of vent register. Two other legs are bendable to position their bottom ends in contact with surface area outside of vent register, below U hook and at a sufficient distance apart, for supporting the device and preventing the rotational and swivel movements of the device.

9 Claims, 2 Drawing Sheets

MOUNTING DEVICE AND METHOD FOR REMOTELY MOUNTING CELL PHONE TO VEHICLE VENT REGISTER

BACKGROUND OF THE INVENTION

Now day, there are various mounting devices in prior art for mounting cell phone to vehicle windshield, dash board or vent register. Among vent mounting devices, there are various means for attaching the device to louver of vent register. The simplest one is by adopting a clip at the back of a magnetic plate or bracket, where cell phone is mounted to, for mounting the device to louver by frictional force. Such device suffers a major drawback of mounting cell phone immediately before vent register, and causing air flow to be substantially blocked by cell phone. Another drawback is that cell phone may get over heated when hot vent air is turned on. Can an extension arm be added to such device for remotely mounting cell phone without blocking air flow?

Author of present invention finds the answer is no for the following reasons. From a mechanics point of view, if cell phone is mounted at a greater distance from vent register, the weight of cell phone could generate a greater rotational moment (=weight×distance) to rotate the louver or the device, and generate a greater pulling force to pull the device out of louver. By considering the fact that the device is attached to louver simply by frictional force, it becomes obvious that the device must mount cell phone immediately before vent register to avoid the device from being pulled out of louver, and also avoid the rotational and swivel movements of the device.

Some vent mounting devices of prior art adopt a stronger spring-activated compression clip for attaching the device to louver, which may prevent the device from being pulled out of louver, but the device still needs to be mounted immediately before vent register in order to avoid rotational and swivel movements of the device. Therefore, the device still suffers the drawback of mounting cell phone immediately before vent register, and causing air flow to be substantially blocked by cell phone.

Some vent mounting devices of prior art adopt a more complicated mechanism for attaching the device to louver. In which, an anchor plate is fixedly connected a base, a U hook is provided at the anchor plate, and a spring-activated slider is slidably engaged to anchor plate. The device is attached to louver by holding and pulling slider against spring force toward the base while engaging U hook to the rear edge of louver, and then releasing slider to allow slider to press against louver by spring force. Because the slider is a small part located immediately behind the base, "holding and pulling slider against spring force toward the base while engaging U hook to the rear edge of louver" can be a difficult and troublesome task for user. Even though the U hook provides a positive means to prevent the device from being pulled out of louver, but the device still needs to be mounted immediately before vent register to avoid rotational and swivel movements of the device. As a result, the device still suffers the drawback of mounting cell phone immediately before vent register, and causing air flow to be substantially blocked by cell phone.

Therefore, there is still a need for a vent mounting device that provides means for attaching and interlocking the device to louver of vent register, preventing rotational and swivel movements of the device, and remotely mounting cell phone without blocking air flow. Furthermore, there is also a need for a universal vent mounting device for mounting the device to either a horizontal or vertical louver of vent register.

The vent mounting device of present invention adopts a tripod for remotely mounting cell phone to vehicle vent register without blocking air flow. A rotatable U hook is connected to one leg (i.e. the third leg) of the tripod. Tripod's legs are made of known construction to permit bending their shapes, and retaining the shapes after being bent. When tripod is mounted to vent register, U hook is engaged to the rear edge of either a horizontal or vertical louver of vent register, and the bottom ends of first and second legs are engaged to the surface area outside of vent register, below U hook and at a sufficient distance apart, for supporting the tripod and preventing rotational and swivel movements of the tripod. U hook is also slidable along the third leg of tripod to permit the bottom end of third leg being engaged to the front edge of louver while U hook being engaged to the rear edge of louver. As a result, tripod is provided with a positive means for interlocking with both front and rear edges of louver, and preventing the tripod from being pulled out of louver when it is subjected to an external force, particularly a G force (i.e. gravity force) caused by driving vehicle on a bumpy road. The mounting device of present invention has successfully passed actual road tests, in which, the tripod is subjected to a weight load substantially greater than the weight of cell phone while the vehicle is driven under extremely accelerating speeds and extremely bumpy road conditions.

SUMMARY OF THE INVENTION

One objective of present invention is to provide a universal vent mounting device for mounting cell phone to either a horizontal or vertical louver of vehicle vent register.

Another objective of present invention is to provide such a device with means for remotely mounting cell phone without blocking air flow.

Another objective of present invention is to provide such a device with means for attaching and interlocking the device to louver of vent register, and preventing rotational and swivel movements of the device.

DETAILED DESCRIPTION OF THE DRAWINGS

Figure 1:
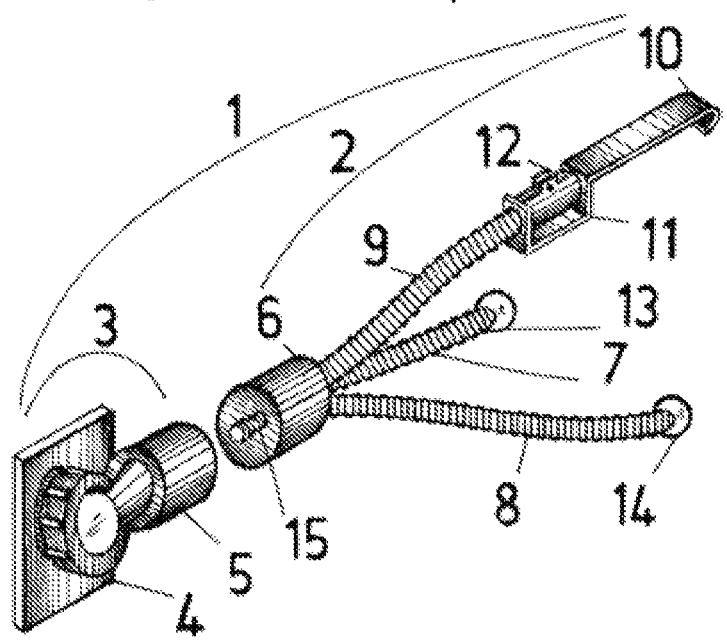
FIG. 1 shows a perspective view of a preferred embodiment of vent mounting device of present invention. (for exemplary purpose)

FIG. 1 shows a perspective view of the vent mounting device 1 of present invention, which comprises of a first assembly 2 and a second assembly 3. The first assembly 2 is constructed of a tripod 2 for mounting to the louver of vehicle vent register (not shown), and the second assembly 3 is constructed of a magnetic plate 4 for magnetically mounting cell phone (not shown), and a swivel joint 5 for connecting magnetic plate 4 to connector 6 of tripod 2.

Tripod 2 has a first leg 7, a second leg 8 and a third leg 9 fixedly connected to connector 6 at three diagonal points of an equal-side triangle. These legs are made of known construction to permit bending their shapes, and retaining the shapes after being bent.

A U hook 10 is longitudinally connected to third leg 9. U hook 10 is made of a rectangular plate that has a reverse U shape hook 10 formed at the front end, and a bracket 11 formed at the rear end. Bracket 11 comprises of a horizontal plate and two vertical plates having two center holes. U hook 10 is connected to third leg 9 by firstly inserting a pipe clamp 12 within bracket 11, and secondly inserting third leg 9 through bracket 11 and pipe clamp 12. Pipe clamp 12, which is well known in prior art and can be in various forms different from the form as shown in FIG. 1, has a width about equal to the internal width of bracket 11, so that pipe clamp 12 restricts U hook 10 from sliding along third leg 9 in either direction. Alternatively, pipe clamp 12 can be substituted by a clipping device such as a binder clip well known in prior art. In this case, U hook 10 is connected to third leg 9 by firstly inserting third leg 9 through bracket 11, and secondly mounting the clipping device onto third leg 9 within bracket 11. As a result, U hook 10 is rotatable about the longitudinal axis of third leg 9, but restricted from sliding along third leg 9. However, U hook 10 is capable of sliding along third leg 9 by adjusting the tightness of pipe clamp 12 with a turn knob (not shown).

The method for attaching the device 1 to either a horizontal or vertical louver of vehicle vent register consists of the following steps: (1). bending and orientating the shapes of first, second and third legs in an effort to position the bottom ends of first and second legs at a sufficient distance apart and below U hook 10, and at about the same distance from U hook 10; (2). rotating U hook 10 to either a horizontal or vertical position to match the position of louver accordingly, projecting U hook 10 downwardly if device 1 is mounted to a horizontal louver, projecting U hook 10 toward the front passenger side of vehicle if device 1 is mounted to a vertical louver and cell phone needs to be operated by the driver, or projecting U hook 10 toward the driver side of vehicle if device is mounted to a vertical louver and cell phone needs to be operated by the front passenger; and (3). simultaneously engaging U hook 10 to the rear edge of louver, and positioning the bottom ends of first and second legs in contact with the surface area outside of vent register in a single rotational action.

The bottom ends of first and second legs (7 and 8) are installed with resilient rubber balls 13 and 14 for preventing slippage, and protecting the contact surface outside of vent register from being scratched. A thread bolt 15 is anchored at connector 6 for connecting to a socket (not shown) at swivel joint 5. Therefore, thread bolt 15 provides means for removably connecting the first and second assemblies 2 and 3.

In FIG. 1, U hook 10 is capable of sliding along third leg 9 by adjusting the tightness of pipe clamp 12 with a turn knob (not shown). By doing so, U hook 10 is slidable to permit positioning U hook 10 at a predetermined distance before the bottom end of third leg 9, and positioning the bottom end of third leg 9 flush to the front edge of louver while engaging U hook 10 to the rear edge of louver. This provides a positive means to prevent U hook from disengaging from louver when the mounting device 1 is subjected to external forces, such as G force (i.e. gravity force) while driving vehicle on an extremely bumpy road. In this case, it is suggested a resilient rubber ball be installed at the bottom end of third leg 9 (not shown in FIG. 1) after U hook 10 being connected to third leg 9. This is because resilient rubber ball not only protects the front edge of louver from being scratched, but also creates a larger contact surface area with the front edge of louver.

Figure 2:
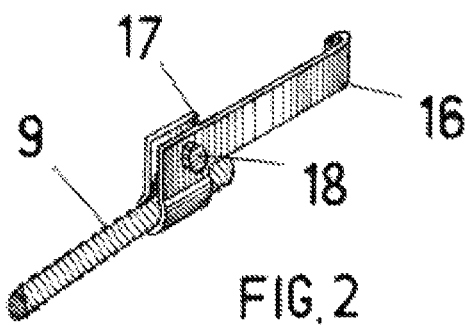
FIG. 2 shows an alternative configuration of U hook 10 of FIG. 1.

FIG. 2 shows an alternative configuration of U hook 10 in FIG. 1. In FIG. 2, U hook 16 is made of an L shape angle plate that has a reverse U shape hook formed at the end of one leg, and a pipe clamp 17 formed by another leg. U hook 16 is longitudinally connected to third leg 9 by inserting third leg 9 through pipe clamp 17. Therefore, U hook 16 is rotatable about the longitudinal axis of third leg 9, but restricted from sliding along third leg 9 by pipe clamp 17. However, U hook 16 is capable of sliding along third leg 9 by adjusting the tightness of pipe clamp 17 with a turn knob 18. By doing so, U hook 16 is slidable to permit positioning U hook 16 at a predetermined distance before the bottom end of third leg 9, and positioning the bottom end of third leg 9 flush to the front edge of louver while engaging U hook 16 to the rear edge of louver. Similarly, it is suggested a resilient rubber ball be installed at the bottom end of third leg 9 (not shown in FIG. 2) after U hook 16 being connected to third leg 9.

Figure 3:
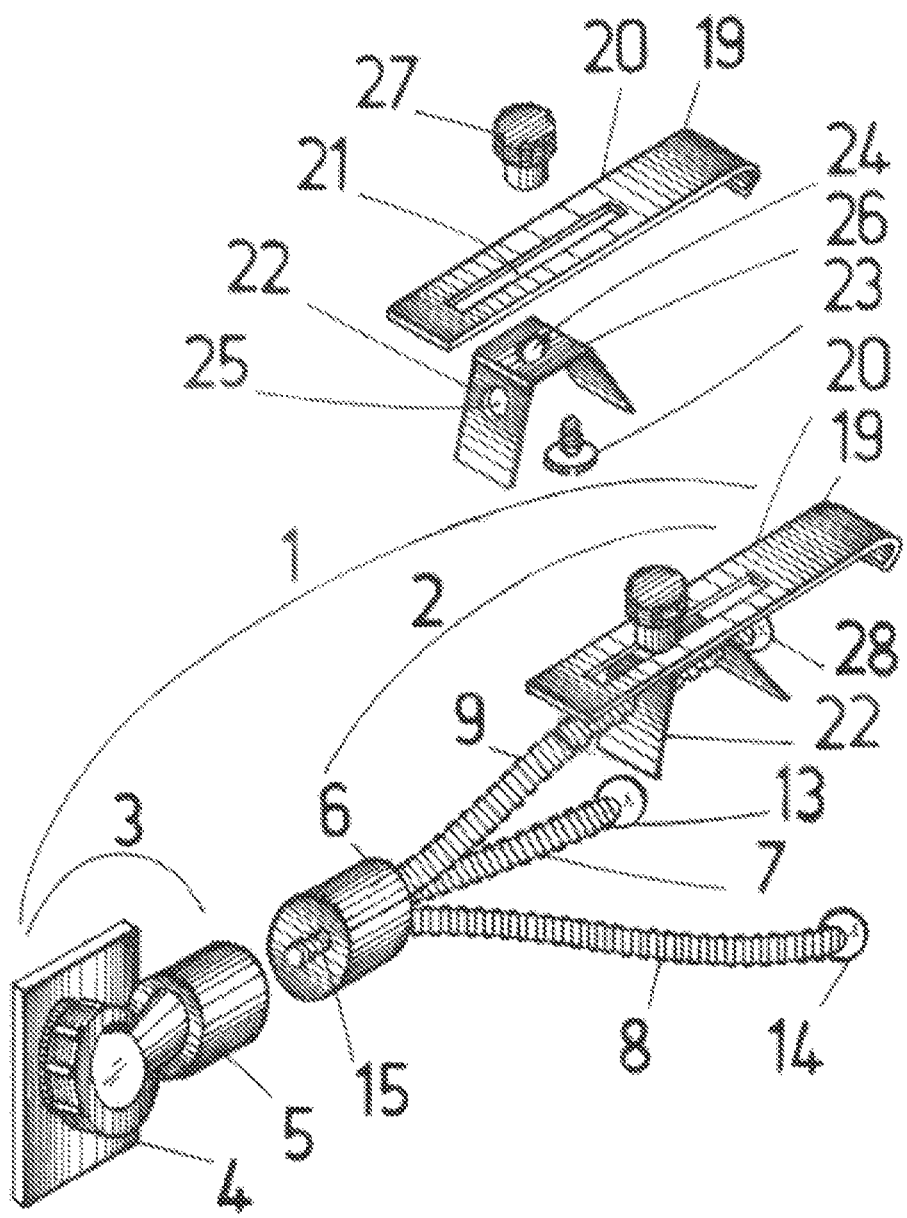
FIG. 3 shows another alternative configuration of U hook 10 of FIG. 1.

FIG. 3 shows another alternative configuration of U hook 10 in FIG. 1. FIG. 3 shows all existing parts of FIG. 1 with exception of parts 10, 11 and 12, which are associated with U hook 10. In FIG. 3, new U hook 19, which replaces U hook 10 in FIG. 1, is made of an elongated rectangular plate 20 that has a longitudinal slot hole 21 formed in mid section, and a reverse U shape hook 19 formed at the front end. A rod connecting device 22, which is well known in prior art, is fixedly connected to the rear end of rectangular plate 20 by a mechanical fastener 23. Rod connecting device 22 comprises of a horizontal spring plate having a center hole 24, and two inclined spring plates having two center holes 25 and 26. Rod connecting device 22 is connected to rectangular plate 20 by inserting mechanical fastener 23 through the center hole 24 and slot hole 21. Rod connecting device 22 is connected to third leg 9 by holding and pressing the inclined spring plates toward each other while inserting third leg 9 through center holes 25 and 26. Therefore, U hook 19 is rotatable about the longitudinal axis of third leg 9, but is restricted from sliding along third leg 9 by rod connecting device 22. U hook 19 is capable of sliding along third leg 9 by two means. The first means, while rod connecting device 22 is fixedly connected to third leg 9 without possibility of sliding movement, is to slide rectangular plate 20 along said third leg by adjusting the tightness of mechanical fastener 23 with knurled thumb nut 27. The second means, while rod connecting device 22 is fixedly connected to rectangular plate 20, is to slide rod connecting device 22 along third leg 9 by holding and pressing its inclined spring plates toward each other. Alternatively, the rectangular plate 20 in FIG. 3 can be made without having the slot hole 21, and fixedly connected with rod connecting device 22 by a welding, adhesive or mechanical fastener means different from what is shown in FIG. 3. In this case, U hook 19 is capable of sliding along third leg 9 simply by holding and pressing the inclined spring plates of rod connecting device 22 toward each other. Alternatively, rod connecting device 22 in FIG. 3, which is made of stamping a spring plate into a horizontal spring plate and two inclined spring plates, can be made of a first regular plate, a second and third regular plates rotatably and inclinedly connected to the opposite sides of the first plate, and a spiral spring connected between the second and third inclined plates. In this case, rod connecting device 22 is connected to third leg 9 by holding and pressing the inclined second and third plates toward each other against spring force, while inserting third leg 9 through the center holes of second and third inclined plates, and the hollow center core of spiral spring.

Clearly, U hook 19 is slidable to permit positioning U hook 19 at a predetermined distance before the bottom end of third leg 9, and positioning the bottom end of third leg 9 flush to the front edge of louver while engaging U hook 19 to the rear edge of louver. This provides a positive means to prevent U hook 19 from disengaging from louver when the mounting device 1 of present invention is subjected to external forces, such as G force (i.e. gravity force) while driving vehicle on an extremely bumpy road. A resilient rubber ball 28 is installed at the bottom end of third leg 9 after U hook 19 being connected to third leg 9. Resilient rubber ball 28 not only protects the front edge of louver from being scratched, but also creates a larger contact surface area with the front edge of louver. As a result, U hook 19 can't possibly be disengaged from louver, unless action is taken to adjust the distance between U hook 19 and the bottom end of third leg 9.

The mounting device of present invention has successfully passed actual load tests without being rotated, swiveled, or pulled out of louver, in which, the device is subjected to a weight load substantially greater than the weight of cell phone while the vehicle is driven under accelerating speeds and extremely bumpy road conditions.

One important aspect of mounting device 1 of present invention is that, in order to retain the shape of the legs of tripod after being bent, the legs must be fixedly connected to connector 6 without possibility of rotational or swivel movements. The legs can be fixedly connected to connector 6 by known construction well known in prior art. In order to position the bottom ends of the first and second legs in contact with the surface area outside of vent register, at sufficient distance apart and below U hook 10, and at about the same distance from U hook 10 without possibility of rotational or swivel moments, at least the first and second legs need to be fixedly connected to connector 6. But in present invention, it is suggested that all three legs are fixedly connected to connector 6, bendable and repositionable. This is for purpose of making the device more capable of universally adjusting to various shapes and sizes of vehicle vent registers.

Another important aspect of mounting device 1 of present invention is that, in order to provide a universal means for mounting the device to either a horizontal or vertical louver, U hook 10 is rotatably connected to third leg 9, and third leg 9 is fixedly connected to connector 6. Such universal means can be alternatively achieved by rotatably connecting third leg 9 to connector 6, and fixedly connecting U hook 10 to third leg 9. In this case (not shown in FIG. 1), third leg 9 has a pipe sleeve fixedly connected to its top end by known means in prior art; connector 6 has a built-in cylinder with a bore size to fit and receive this pipe sleeve; and the cylinder has an end closure that has a center hole to fit and receive third leg 9. Third leg 9 is rotatably connected to connector 6 (before connecting U hook 10 to its bottom end) by means of inserting leg 9 through the cylinder bore and the center hole at end enclosure, fitting pipe sleeve within cylinder nicely, and enclosing the cylinder and connector 6 with a front cover.

It is understood that FIG. 1 is not intended to show the construction details of magnetic plate 4, swivel joint 5 and connector 6 because they are well known in prior art. What is shown in FIG. 1 is for exemplary purpose, and should not be considered for limiting the scope of present invention. For another example, the plate of U hook 10 can be expanded in longitudinal direction and directly connected to connector 6, so that U hook 10 itself becomes the third leg 9 of tripod 2. In this case, bracket 11 and clamp 12 are no longer required.

It is also understood that some modifications to the vent mounting device 1 without affecting the objectives of present invention are allowed and considered within the scope of present invention. For example, magnetic plate 4 can be substituted by a universal cell phone mounting bracket well known in prior art without exceeding the scope of present invention. For another example, second assembly 3 can be connected to first assembly 2 by other means in lieu of thread bolt 15 without exceeding the scope of present invention. For another example, clamp 12 can be substituted by other mechanical fasteners well known in prior art without exceeding the scope of present invention. For another example, rod connecting device 22 (FIG. 3), which is made of stamping a spring plate into a horizontal spring plate and two inclined spring plates, can be made of a first regular plate, a second and third regular plates rotatably and inclinedly connected to the opposite sides of the first plate, and a spiral spring connected between the second and third inclined plates without exceeding the scope of present invention. It is important to note that rod connecting device 22 (FIG. 3) can be substituted by various rod connecting devices well known in prior without exceeding the scope of present invention, provided the rod connecting devices of prior art operate by the same principal of rod connecting device 22. This principal is to provide rod connecting device with means of converting its structural configuration and operating at a first or second operating condition. Under this principal, U hook is connected to third leg 9 by means of inserting the bottom end of third leg 9 into and across rod connecting device while rod connecting device being activated into the first operating condition; U hook is fixedly connected to third leg 9 and restricted from sliding along third leg 9 while rod connecting device being de-activated into the second operating condition; U hook is adapted to rotate about third leg 9 by means of applying a rotational force upon U hook while rod connecting device being activated or de-activated; and U hook is adapted to slide along or disconnected from third leg 9 by means of applying a pulling force upon U hook while rod connecting device being activated.

In summary, the mounting device 1 of present invention offers the following important unique features:

(1). The three legs of tripod serve as extension arms for remotely mounting cell phone to vehicle vent register without blocking air flow. Besides preventing cell phone from blocking air flow, the tripod legs (i.e. extension arms) are also able to position cell phone closer to driver or front seat passenger for better read and easier operation of cell phone.

(2). The mounting device of present invention is provided with a positive means for interlocking with both front and rear edges of louver, and preventing the device from being pulled out from louver of vent register when it is subjected to an external force.

(3). By positioning the bottom ends of first and second legs in contact with surface area outside of vent register, at a sufficient distance apart and below U hook, the weight center of the device always falls between them, so that the device can't possibly rotate or swivel under the weight load of cell phone.

(4). The device offers a universal means for mounting to either a horizontal or vertical louver simply by rotating U hook to match the position of louver accordingly.

(5). The device is convertible to a table top cell phone stand by simply disconnecting U hook from tripod leg, or convertible to a table top camera stand by disconnecting U hook from tripod leg, and disconnecting second assembly from the connector of tripod. Such unique feature offers a significant marketing advantage (i.e. a "3-in-1" device), and also saves manufacturing costs because there is only a simple single part (i.e. U hook) needs to be customer made.

What is claimed is:

1. A universal mounting assembly for the intended use of remotely mounting an object onto a horizontal or vertical outlet louver of a wall-mounted air vent register, without substantially blocking air flow, in which:
   said mounting assembly comprises of a tripod, a rectangular extension plate, and a rod connecting device;
   said tripod includes a first, second and third legs, and each top end of said first, second and third legs is fixedly and diagonally connected to a bottom end of a connector;
   a top end of said connector includes a mechanical device for connecting said object to said tripod;
   at least said first and second legs are flexible and capable of bending their shapes and retaining the shapes after being bent;
   said extension plate includes an integral U hook at the front end of said extension plate;
   said rod connecting device comprises of a first section fixedly connected to the rear end of said extension plate, and a second section removably connected to the bottom end of said third leg;
   said rod connecting device is rotatable about the longitudinal axis of said third leg of said tripod; and
   said mounting assembly is mounted to said outlet louver by positioning the bottom ends of said first and second legs apart and below said bottom end of said third leg, rotating said U hook to a horizontal or vertical position according to the position of said outlet louver, engaging said U hook to the rear-inner edge of said outlet louver, and engaging said bottom ends of said first and second legs onto the wall surface outside of said air vent register.

2. The mounting assembly according to claim 1, in which, said mechanical device at said top end of said connector comprises of a thread bolt for threadedly connecting said object to said tripod.

3. A universal mounting assembly for the intended use of remotely mounting a cell phone to a horizontal or vertical outlet louver of a vehicle air vent register, without substantially blocking air flow, in which:
   said mounting assembly comprises of a first and second assemblies;
   said first assembly comprises of a tripod, a rectangular extension plate, and a rod connecting device;
   said tripod includes a first, second and third flexible legs capable of bending their shapes and retaining the shapes after being bent;
   each top end said first, second and third legs is fixedly and diagonally connected to a bottom end of a connector;
   a top end of said connector includes a mechanical device for connecting said second assembly to said first assembly;
   said extension plate includes an integral U hook at the front end of said extension plate;
   said rod connecting device comprises of a first section fixedly connected to the rear end of said extension plate, and a second section removably connected to the bottom end of said third leg;
   said rod connecting device is rotatable about the longitudinal axis of said third leg of said tripod, and capable of sliding along said third leg;
   said second assembly comprises of a first section for removably connecting said cell phone to said second assembly, and a second section for removably connecting to said mechanical device at said top end of said connector of said tripod; and
   said mounting assembly is mounted to said outlet louver by positioning the bottom ends of said first and second legs apart and below said bottom end of said third leg, rotating said U hook to a horizontal or vertical position according to the position of said outlet louver, engaging said U hook to the rear-inner edge of said outlet louver, sliding and engaging said bottom end of said third leg to the front-outer edge of said outlet louver, and engaging said bottom ends of said first and second legs onto the wall surface outside of said air vent register.

4. The mounting assembly according to claim 1 or 3, in which, a resilient rubber shoe is connected to each of said bottom ends of said first, second and third legs of said tripod.

5. The mounting assembly according to claim 3, in which, said first section of said second assembly includes a magnetic plate for removably and magnetically connecting said cell phone to said second assembly, and said second section of said second assembly includes a swivel joint for removably connecting said magnetic plate to said mechanical device of said connector of said tripod in said first assembly.

6. The mounting assembly according to claim 1 or 3, in which, said rod connecting device comprises of a horizontal spring plate and two opposite integral inclined spring plates, said horizontal spring plate is fixedly connected to said rear end of said extension plate, and each of said inclined spring plate has a center hole for inserting and removably connecting to said third leg of said tripod.

7. A method for remotely mounting an object to an outlet louver of a wall-mounted air vent register, comprising steps of:
   mounting said object to a tripod that has a first, second and third legs,
   inserting and connecting the bottom end of said third leg to a rod connecting device that is fixedly connected to an extension plate having an integral U hook at the front end of said extension plate,
   positioning the bottom ends of said first and second legs apart and below said bottom end of said third leg,
   engaging said U hook to the rear-inner edge of said outlet louver, and
   engaging said bottom ends of said first and second legs onto the wall surface outside of said air vent register.

8. The mounting method according to claim 7, in which, said method further includes a step of engaging said bottom end of said third leg to the front-outer edge of said outlet louver.

9. A universal connecting device for the intended use of connecting a round-shape extension rod to an elongated panel in the direction parallel to the longitudinal axis of said rod but perpendicular to the longitudinal axis of said panel, and restricting movement of said rod in the direction toward or away from said panel, in which:
   said connecting device comprises an elongated rigid plate extending from a front end to a rear end of said rigid plate, and a stamped plate;
   said rigid plate comprises a U hook extending downwardly and rearwardly from said front end of said rigid plate;
   said stamped plate comprises a first horizontal spring plate, a second incline spring plate slopping forwardly and downwardly from a top end that is integrally connected to a front end of said first spring plate, and a third incline spring plate slopping rearwardly and downwardly from a top end that is integrally connected to a rear end of said first spring plate;

each of said second and third spring plates has a center hole aligned for inserting said rod through an open end of said rod;

said first spring plate is fixedly connected to a bottom surface of said rigid plate adjacent to said rear end of said rigid plate, wherein the longitudinal axis of said rigid plate is parallel to said longitudinal axis of said rod;

said U hook is rotatable about said longitudinal axis of said rod;

said U hook is free to slide along said rod when said second and third spring plates are pressed and held toward each other by force;

said U hook is restricted from sliding along said rod when said second and third spring plates are released from force; and said connecting device is capable of restricting said movement of said rod by means of engaging said U hook and said open end of said rod to a front and rear edges of said panel respectively.

\* \* \* \* \*